United States Patent
Visser et al.

(10) Patent No.: US 9,813,509 B1
(45) Date of Patent: Nov. 7, 2017

(54) TEMPLATE GENERATOR FOR FREQUENTLY OCCURRING APPLICATION PROGRAMMING INTERFACE CALL SEQUENCES

(71) Applicant: AMAZON TECHNOLOGIES, INC., Reno, NV (US)

(72) Inventors: Willem Petrus Visser, Cape Town (ZA); Marc John Brooker, Seattle, WA (US); Christopher Richard Jacques de Kadt, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 240 days.

(21) Appl. No.: 14/734,968

(22) Filed: Jun. 9, 2015

(51) Int. Cl.
*G06F 15/173* (2006.01)
*H04L 29/08* (2006.01)
*G06Q 10/10* (2012.01)
*G06F 9/54* (2006.01)

(52) U.S. Cl.
CPC .............. *H04L 67/16* (2013.01); *G06F 9/547* (2013.01); *G06Q 10/10* (2013.01)

(58) Field of Classification Search
USPC ........................................ 709/223, 227, 224
See application file for complete search history.

Primary Examiner — Lan-Dai T Truong
(74) Attorney, Agent, or Firm — Blank Rome LLP

(57) ABSTRACT

A system includes a plurality of computing nodes. Each computing nodes includes a processor and memory. The computing nodes include a plurality of instances and a template generator. The template generator is configured to receive a plurality of application programming interface (API) calls to the configure instances, detect a pattern in the received plurality of API calls, and generate a template based on the detected pattern, the template executable to configure an instance.

20 Claims, 7 Drawing Sheets

TEMPLATE GENERATOR FOR FREQUENTLY OCCURRING APPLICATION PROGRAMMING INTERFACE CALL SEQUENCES

BACKGROUND

As an increasing number of applications and services are being made available over networks such as the Internet, an increasing number of service providers are turning to technologies such as cloud computing. In general, cloud computing is an approach to providing access to remote resources through a network. Such resources may include hardware and/or software. Hardware resources may include computers (e.g., servers), mass storage devices, and other useful hardware elements. Software resources may include operating systems, databases, etc. Customers of the service provider can create and manage virtual machines using the service provider's resources and load customer-specific software applications on the virtual machines. The customer then may pay for use of the service provider's resources rather than owning and operating his or her own hardware and software resources.

User interfaces permit customers of the service providers a great deal of functionality with numerous options to access and use the resources provided by the service provider. Customers interact with the service provider's network to perform various operations such as creating and managing virtual machines, creating and managing storage subsystems, etc. Often, customers are forced to repeat such operations, for example, to create additional virtual machines as the need for additional support arises.

BRIEF DESCRIPTION OF THE DRAWINGS

For a detailed description of various examples, reference will now be made to the accompanying drawings in which.

DETAILED DESCRIPTION

Figure 1:
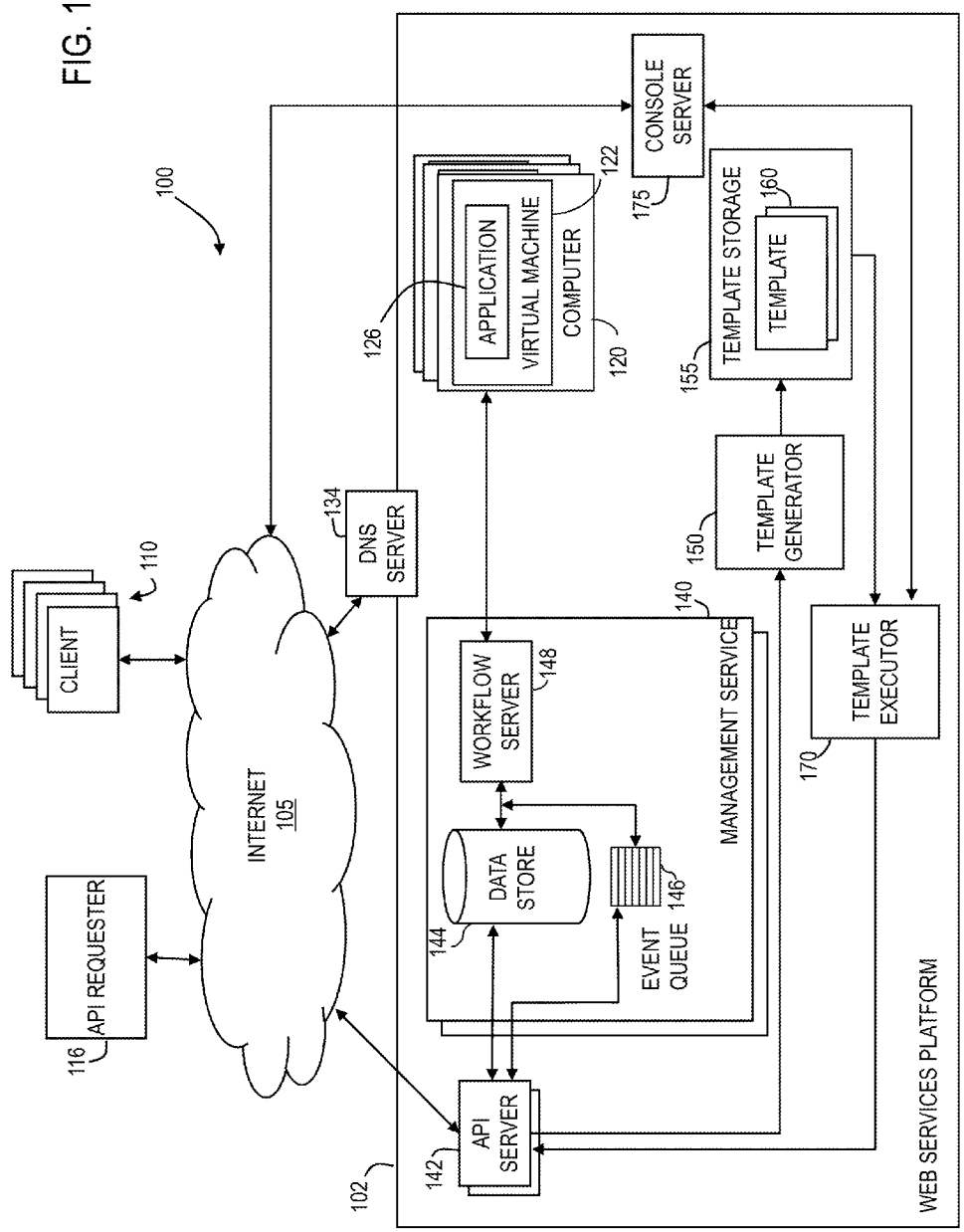
FIG. 1 illustrates a web services platform that analyzes customer activity to detect repeat patterns and to generate executable templates based on the detected repeat patterns in accordance with various implementations.

The following disclosure is directed to the detection of usage patterns for customers of service providers and to the generation of executable templates based on the detected patterns. The service providers operate web service platforms that offer hardware and software resources as a service to customers, thereby negating the need for the customers to themselves own and operate their own hardware and software resources. The disclosed web services platform provides a service that detects repeat sequences of application programming interface (API) calls among individual customers as well as across multiple customers. The API calls invoke functions of the services of the service provider such as configuring instances (e.g., virtual machines) that customers can instantiate on the web services platform. A template generator generates templates which then can be executed by customers to automate the sequence of API calls they have repeatedly performed.

API calls are initiated by the customers to perform any of a variety of operations. Examples of such operations include launching virtual machines, injecting scripts into virtual machines, launching containers, creating or modifying virtual networks, assuming security roles, configuring auto-scaling groups, creating load balancers, attaching and detaching block storage volumes, attaching and detaching internet protocol (IP) addresses, attaching and detaching network interfaces, creating virtual firewalls, etc. Each such operation may require multiple steps to be performed by the customer, and each step may cause a particular function of a service to be invoked. The customer may use a console to perform the various required steps. The console may provide a graphical user interface by which a customer can select from various displayed options. Based on the user's selections, the console causes various API calls to be generated and submitted on behalf of the customer to the service provider's web services platform. A command line interface (CLI) also can be used by a customer to submit API calls to the web services platform. The web services platform executes the various API calls to implement the actions desired by the customer. The stream of API calls from customers to the web services platform is analyzed for detection of repeat sequences of API calls. The API calls in a detected repeat sequence can be included in a template, which subsequently can be executed to perform the operations (e.g., invocation of service functions) corresponding to the API calls of the template.

In one example, the template generator analyzes the API calls of an individual customer and detects that the customer repeatedly performs the same activity (e.g., creating an virtual machine instances). In response to detecting a pattern, the template generator may cause the console to display a message to prompt the customer to consent to the creation of an executable template. If the customer consents, the template generator generates a template that can be executed whenever desired by the customer. Upon execution of the template, the pattern of API calls is automatically performed on behalf of the customer thereby relieving the customer from manually causing the APIs to be executed through use of a console, CLI, an API of the template generator, etc. In some embodiments, the level of abstraction in the template can be granular, down to the input parameters used in the API. For example, it could include parameters such as a number of virtual machine instances to launch, selection of an instance type, selection of an availability zone, etc. However, in some instances the template generator may not detect a pattern at such a granular level and in these embodiments the template generator may prompt a customer to input a parameter needed for a given API call in the template when the template is invoked.

In another example, the template generator analyzes API calls across multiple customers. The template generator detects whether each of multiple customers frequently perform the same activities, and generates a template based on multi-customer usage patterns at a level of abstraction common to the customers. That is, a template is generated if multiple customers each repeatedly perform the same sequence of API calls.

FIG. 1 shows a schematic diagram of a system 100 by which customers of a service provider are able to have their application and storage needs met by the hardware and software resources provided by the service provider. Customers of the service provider are able to access a web services platform 102 to create and manage services which are usable by clients 110 of the customers. For example, a customer may want its website to be hosted on the web services platform 102, thereby avoiding the need for the customer to own and operate its own server computers, switches, routers, etc. and related software infrastructure (e.g., operating systems, databases, etc.).

The web services platform 102 communicates with an application programming interface (API) requestor 116 and one or more clients 110 via the Internet 105. The API requestor 116 is a management entity, usable by customers, that provides control information in the form of API calls to the web services platform 102, and receives status information from the web services platform 102. The API requestor 116 may be a management console presented in a web browser executed by a computer, a command line interface executed by a computer, an automated management system or script executed by a computer, etc. For the example of a management console, a console server 175 may be included in the web services platform 102. The management server 175 generates a web console and sends the web console (e.g., multiple web pages) to a browser executed on the customer's computer. Through the web console displayed on the customer's computer, the customer is able to select or otherwise submit API calls. The customer logs in to the customer's account (e.g., via a username and password or other credentials). The console server 175 may generate a session identifier that is unique to that particular customer session. The session identifier and a cryptographic key of the customer can be used to authenticate each API call submitted by the user. The session identifier may be included with each API request initiated by the customer, and the session identifier may be used a form of authentication by services to which the API calls cause an affect.

Regardless of the particular form for the customer to interact with the web services platform, the API requestor 116 submits API calls through the Internet 105 to one or more management services 140 for further processing. The clients 110 are computing devices that request services from an application 126 executed by the web services platform 102. A computing device suitable for use as an API requestor 116 or client 110 may be a desktop computer, a laptop computer, a tablet computer, a smartphone, or other type of computing device.

The domain name service (DNS) server 134 stores DNS records that may include network addresses (e.g., Internet Protocol (IP) addresses) of servers that correspond to domain names. For example, DNS server 134 may receive hypertext transfer protocol (HTTP) requests from clients 110 for IP addresses via which services provided by the web services platform 102 may be accessed. On receipt of such a request, the DNS server 134 may perform a look-up function and return IP addresses to the clients 110. The clients 110 use the returned IP addresses to access the applications 126.

The web services platform 102 includes a plurality of computers arranged to execute virtual machines on behalf of customers and each virtual machine can include, for example, one or more applications 126. The web services platform 102 executes each instance of the application 126 in a virtual machine 122. Each virtual machine 122 is executed by a computer 120.

The web services platform 102 includes the management services 140 for the various services offered by the service provider that operates the web services platform 102. For example, the illustrated service shows a compute service that permit customers to create and manage instances such as virtual machine instances. Other example services include a block storage service that permits customers to create and attach block storage devices to virtual machine instances, a network address service that allows customers to reserve public internet protocol addresses and attach them to virtual machine instances, and a security group service that allows customers to create firewall rules that are applied to traffic to and from their virtual machine instances. Each management service 140 interacts with an API server 142 and includes a data store 144, an event queue 146, and a workflow server 148. The API server 142 receives requests (API calls) from the API requester 116 to configure an instance (virtual machine instance 122, load balancer instance, firewall instance storage instance, etc.). The API server 142 configures the management service 140 to execute the API calls. In some implementations, a separate API server 142 may be provided for each service offered by the service provider for its customers. For example, the API server 142 may receive an API request to create a virtual machine 122, etc. Upon receipt of an API call from the API requestor 116, the API server 142 may store parameters received as part of the API call in the data store 144. The data store 144 provides persistent storage for parameters of the instance to be configured. Parameters received as part of a request may include parameters for the API request (e.g., number and instance type, identifier for a network address, etc.) and/or configuring the instance (e.g., scripts for the instance to run). The API server 142 also may store an event flag in the event queue 146 to indicate that an operation is to be performed with respect to the targeted instance. The event queue 146 stores flags that trigger the workflow server 148 to perform an operation.

The workflow server 148 manages the various instances based on the information stored in the data store 144. For example, the workflow server 148 may create a virtual machine 122 in response to a request from API requester 116 based on the information stored in the data store 144. The workflow server 148 monitors the event queue 146 for flags indicating that an operation affecting the targeted instance is to be performed. If the workflow server 148 reads an event flag from the event queue 146, the workflow server 148 may perform operations to configure the instance as indicated by the parameters stored in the data store 144.

The web services platform 102 also includes a template generator 150, a template storage 155, and a template executor 170. The template generator 150 couples to the API server 142, which may include multiple API servers 142, one each corresponding to a separate service offered by the service provider to its customers. In addition to interacting with the data store 144 and event queue 146 as explained above, the API server 142 also provides a copy of all incoming API calls to the template generator 150. The template generator 150 may receive API calls from additional or different sources as well. For example, the template generator 150 may receive API calls from the data store 144 or from a log service that stores API calls. The template generator 150 analyzes the API calls to detect whether a customer is repeatedly performing the same operation. An operation may be performed by a group of multiple API calls. Each API call may invoke a function of a web service such as a function to instantiate load balancer instances, application instances, etc. Upon detection of such a repeated operation, the template generator 150 generates an executable template 160 containing the API calls of the operation and stores the generated template 160 in template storage 155. The templates 160 can be accessed by the template generator 170 the template storage 155 and executed on behalf of a customer. Upon execution of a template 160 by the template generator, the template generator send API calls to the API server 142 (or another server) to invoke a function of a web service. Receipt of the API calls from the template generator causes the API server 142 to replay the sequence of API calls contained in the template prompting, when appropriate, the customer to supply input parameters for use by one or more of the API calls in the template. Replaying a template may include the API server 142 interacting with the data store 144 and event queue 146 in much the same way as would occur if the API calls had come directly from a customer via the API requester 116.

As noted above, an operation is performed through the execution of multiple API calls. The same operation can be performed multiple times with the exact same sequence of API calls, or with a different sequence of API calls. For example, an application instance can be configured to include a customer-specified instance name, a certain IP address, multiple metadata tags, etc. Each of these configuration points may require a particular API call. The application instance can be created regardless of the particular order of the API calls. The template generator 150 detects the same operation being repeated despite the order of the constituent API calls being varied from operation to operation.

Figure 2:
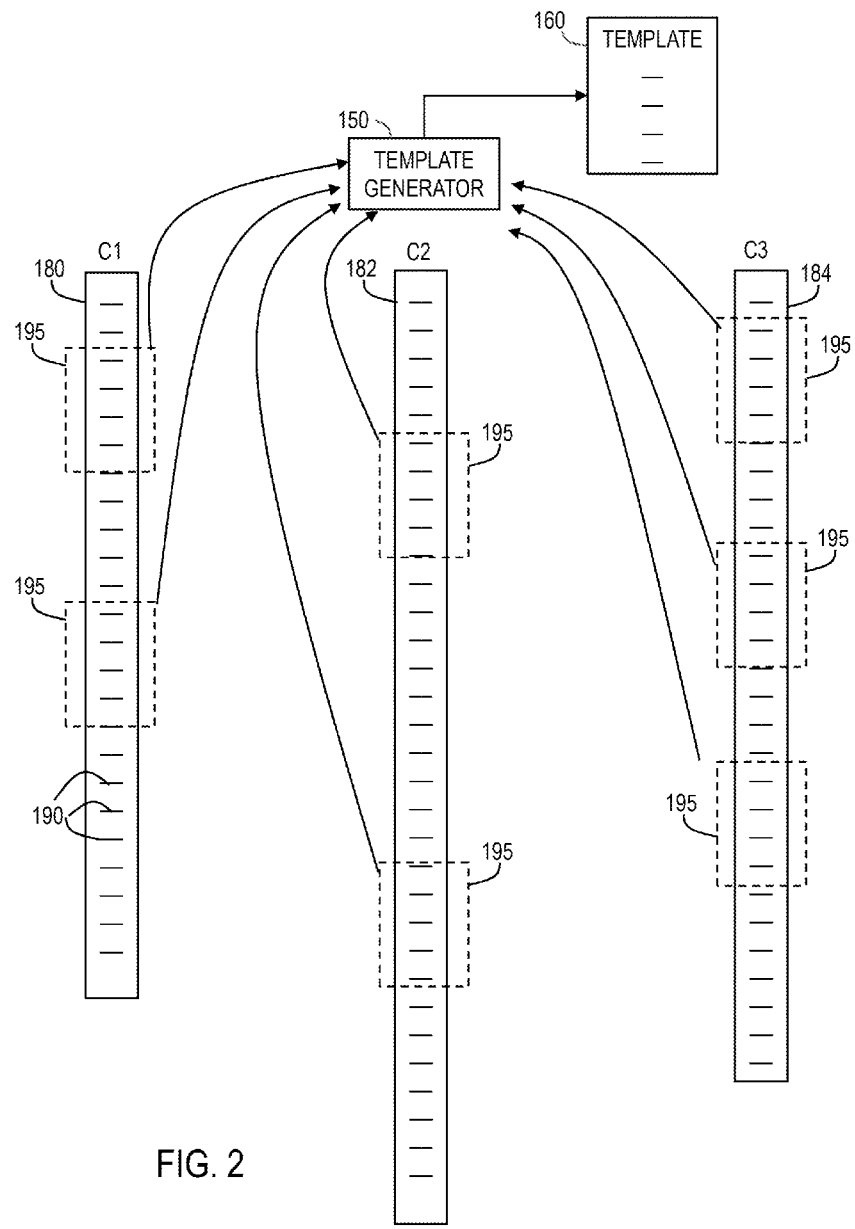
FIG. 2 shows an example of pattern detection across multiple customers in accordance with various implementations.

FIG. 2 shows an example of three sequences 180, 182, and 184 of API calls from each of three different customers (C1, C2, and C3). API call sequence 180 is for customer C1, while API call sequences 182 and 184 are for customers C2 and C3, respectively. Each sequence includes multiple API calls 190. Each sequence 180, 182, 184 may perform one or more operations to configure multiple instances. In this example, the template generator 150 analyzes the three API call sequences 180-184 and detects that each customer has repeated a common pattern of API calls, designated as 195 that performs the same operation. Each common pattern 195 in this example includes the same four API calls, although the number of API calls in a repeating pattern can be a number of API calls other than four. Further, the order of the four API calls can vary between the patterns 195. Customers C1 and C2 have repeated the pattern 195 twice each, and customer C3 has repeated the pattern 195 three times. The template generator 150 generates a template 160 to contain the same four API calls.

Referring again to FIG. 1 and in accordance with various embodiments, the template generator 150 detects the repeated performance of the same operation in a sequence of API calls using any of a variety of techniques. In one example, the template generator 150 receives as inputs any one or more of: console session identifiers, API call names, API call time stamps, customer identifiers, digital signatures, IP addresses, tags, availability zone identifiers, instance identifiers, etc. These input parameters are discussed below. In general, these parameters may indicate that a group of API calls are configured to perform a particular operation such as creating a new application instance, attaching or detaching an elastic IP address, etc.

If a customer interacts with the web services platform 102 via a console, each API call submitted through the console to the API server 142 includes a console session identifier. Each console session is assigned a unique identifier such as a consecutive number or other type of alphanumeric identifier. While not necessarily dispositive, API calls within a given console session, as determined by the console session identifier, are more likely to pertain to the same customer and to be performed as part of a common operation (e.g., configuring an application instance 126) than API calls that are from different console sessions.

Each API call received by the API server 142 also may include a time stamp. The time stamp may be assigned to the API call by the API requester 116 or the API server 142 when it is received. The time stamp may include a date and a time that the API requester 116 generated the API call or transmitted the API call across the Internet 105 to the API server 142. All else being equal, API calls that occur closer in time are more likely to be part of the performance of a common operation than API calls spaced farther apart in time. For example, two API calls spaced seconds apart are more likely to be related than two API calls spaced 10 hours apart.

Each API call also may include a customer identifier. Each customer is assigned a unique alphanumeric identifier. API calls with the same customer identifier are more likely to be part of the performance of a common operation than API calls with different customer identifiers.

For authentication purposes, a customer may cause a digital signature to be included with each API call sent to the API server 142. The API server 142 verifies the received digital signature to help ensure that the received API call is from a legitimate source. API calls with the same digital signature are more likely to be part of the performance of a common operation than API calls with different digital signatures.

Each API call also may include the IP address of the API requester 116 that sent the API call to the API server 142. All else being equal, API calls with the same API requester 116 IP address are more likely to be part of the performance of a common operation than API calls with different IP addresses.

Some customers may use "tags" to manage their resources. Through the use of tags, customers can assign their own metadata to a specified resource. The tags then can be used to manage the resources, rather than using the resources' own resource identifiers. To the extent multiple API calls include the same tag(s), such API calls are likely related compared to API calls that include different tags. Similarly, if resource identifiers are used in the API calls, multiple API calls including the same resource identifier are likely related compared to API calls that include different resource identifiers.

The web services platform 102 may include numerous computing nodes that provide resources to the service provider's customers. The resources to be used may be specified by the customer to be in specific regions. Each region may be a separate geographic area for enhanced fault tolerance. The various regions may be operationally isolated from one or another. Each region may provide multiple availability zones. Resources can be created and managed by customers to be included in specific regions and in specific availability zones within the regions. API calls may include an availability zone identifier or may be resolved by the API server 142 to determine the availability zone corresponding to the API call. All else being equal, API calls targeting resources in the same availability zone are more likely to be part of the performance of a common operation than API calls targeting resources in different availability zones.

The template generator 150 examines the API calls in a plurality of API calls (see FIG. 2, for example). In one example, a group of API calls that have the same console session identifier, time stamps within a predetermined period of time (e.g., within 10 minutes), the same customer identifiers and digital signatures, the same API requester IP addresses, the same tag(s), and that target resources in the same availability zone are likely to be all related to performance of the same operation such as configuring a particular application instance. If API calls are received by the API server 142 from a command line interface (i.e., not a console), there will not be a console session identifier included in the API calls, but one or more of the other factors may be analyzed for a determination as to whether the API calls are related to performance of the same operation. Any one or more of the aforementioned factors or other factors may be used to by the template generator 150 to logically group together multiple API calls as likely being related to performance of the same operation.

Each of multiple groups of API calls may be determined to perform a single operation. Further, the template generator 150 may determine such groups in fact to perform the same operation. For example, for two groups of API calls that are deemed to perform a single operation, the two groups may have the same API call names and thus may be deemed to perform the same operation. In some embodiments, the order of the API call names in each group may be the same or different. Once multiple groups of API calls have been determined likely to have caused the repeated performance of the same operation, the template generator 150 can generate a template 160 that includes the particular API calls in the group. The template 160 is executable to perform the operation corresponding to the API calls in the template. Upon initiation by the customer, the template 160 can be executed by the API server 142 to perform the corresponding operation.

Figure 3:
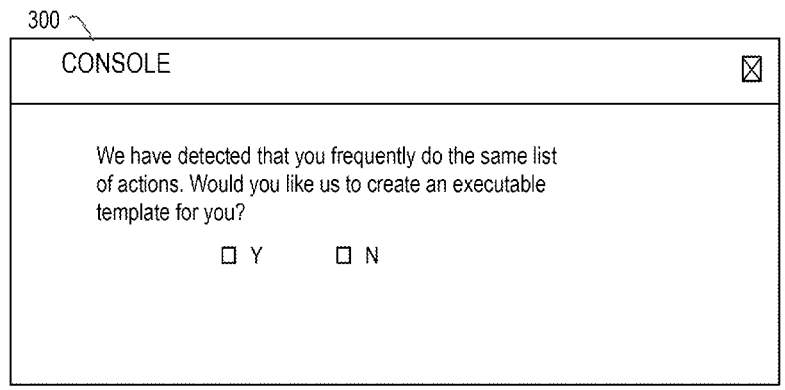
FIG. 3 shows a user interface by which customers are permitted to consent to the creation of templates in accordance with various implementations.

In one embodiment, the template generator 150 analyzes API calls from a single customer. Upon detecting that that particular customer has repeated the same group of API calls determined to be related to the same operation, the template generator 150 may provide a visual indication to the customer that a template 160 can be generated for use by the customer. FIG. 3 shows one example of a user interface 300 in which the customer is told that it has been detected that the customer frequently performs the same list of actions. The customer is prompted to confirm whether the customer wants an executable template to be generated for the customer. The customer can select "yes" or "no." A template 160 is generated by the template generator 150 if the customer selects "yes" but not if the customer selects "no." In other embodiments, the template 160 is generated without having the customer consent to the generation of the template. If a template 160 is to be generated, the customer may be prompted to type or otherwise select a name of the template.

In some embodiments, the template generator 150 analyzes the API calls from multiple customers to determine whether each such customer frequently (e.g., more than once) performs the operation. In this embodiment, the API calls for each customer are individually analyzed as explained above to detect whether each such customer is repeatedly performing the same operation. Then, the detected operations between customers are compared to determine if repeat operations performed by the customers are the same operation. For example, the template generator 150 will determine whether two or more customers repeatedly configure the same type of instance and, if so, generate an executable template 160 for use by such customers. The customers in this example may or may not be prompted to consent to the creation of the template, and instead may simply be afforded the option of using the template 160.

Figure 4:
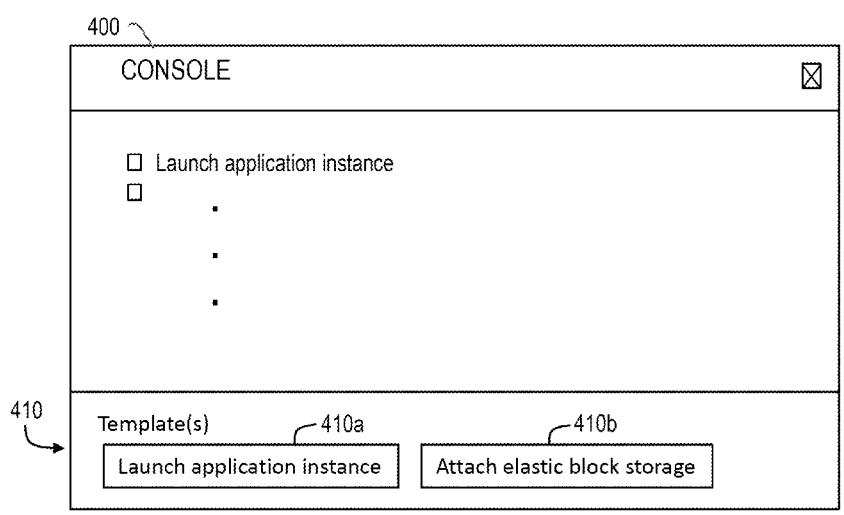
FIG. 4 shows another user interface by which customers can use previously generated templates in accordance with various implementations.

FIG. 4 shows an example of a user interface 400 in which a customer can view whatever templates 410 have been created and made available for that customer. As explained above, user interface 400 may be generated as a web console by the console sever 175 and transmitted to a web browser executing on the customer's computer. The customer has been assigned a session identifier upon initially logging in to the customer's account.

In the example of FIG. 4, the customer has two available templates 410a and 410b. Template 410a is a template that, when executed, causes an application instance to be launched. Template 410b is a template that, when executed, causes block storage (e.g., storage that can be automatically scaled as the customer's storage needs change) to be attached to the customer's application instances 126. Upon selecting a template (such as template 410a and 410b), an API request is sent to the template executor 170. The request may include the identifier of the selected template and a session identifier. The template executor 170 receives the request and extracts a digital signature (e.g., a signature created using a key associated with the customer). The template executor 170 can then use the customer's digital signature to generate or otherwise obtain a temporary credential that inherits the restrictions of the customer's ability to invoke API calls and is restricted to issuing API calls that are included in the selected template. The template executor 17 will then issue API calls to various services based on the API calls that are in the template and use the temporary credential to authenticate itself to the web services that are implicated by each such API call.

Figure 5:
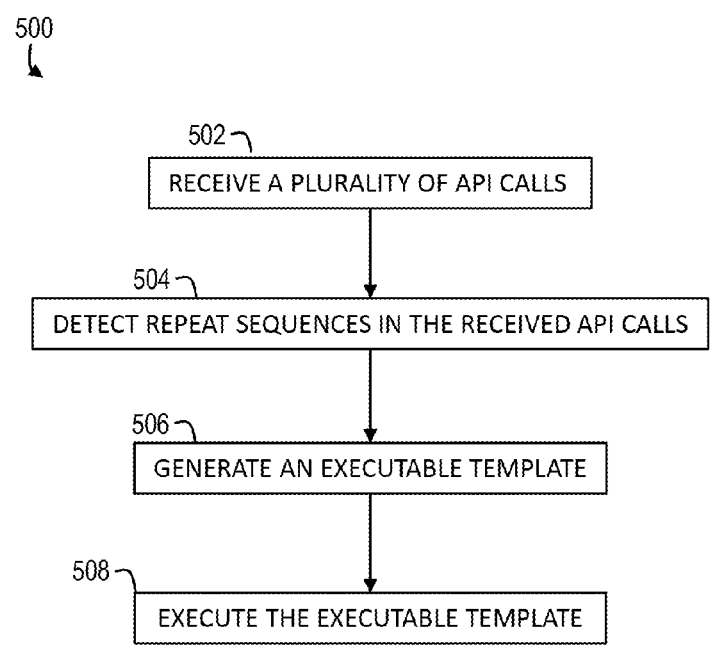
FIG. 5 shows a method by which repeat patterns are detected and templates generated in accordance with various implementations.

FIG. 5 illustrates a method 500 of generating a template 160 in accordance with various embodiments. At 502, the method includes receiving a plurality of API calls. Each API call is operative to invoke a function of a web service. The API calls may be received by the template generator 150 from the API requester 116 via the API server 142. At 504, the template generator detects a pattern present in the received API calls. The detected pattern may be detected based only on an individual customer's API call sequences or based on common API call sequences across multiple customers. At 506, the method further includes generating the executable template based on the detected pattern of API calls. The template may include the API calls in the detected pattern, and the generated template may be stored in template storage 155 for subsequent execution therefrom. The template is usable to automate issuance of a number of web service API calls. At 508, the method also includes executing the executable template to perform an operation. The operation performed is the operation performed by the API calls that were determined to comprise a pattern to generate the template in the first place. That is, a pattern of API calls were previously detected that perform a particular operation, and that operation is performed through the execution of the template at 508. The template generator 170 may be used to retrieve a template 160 from the template storage 155 under control by a customer who has selected a desired template 160 to execute. The customer may select the template via a user interface such as that illustrated in FIG. 4.

Figure 6:
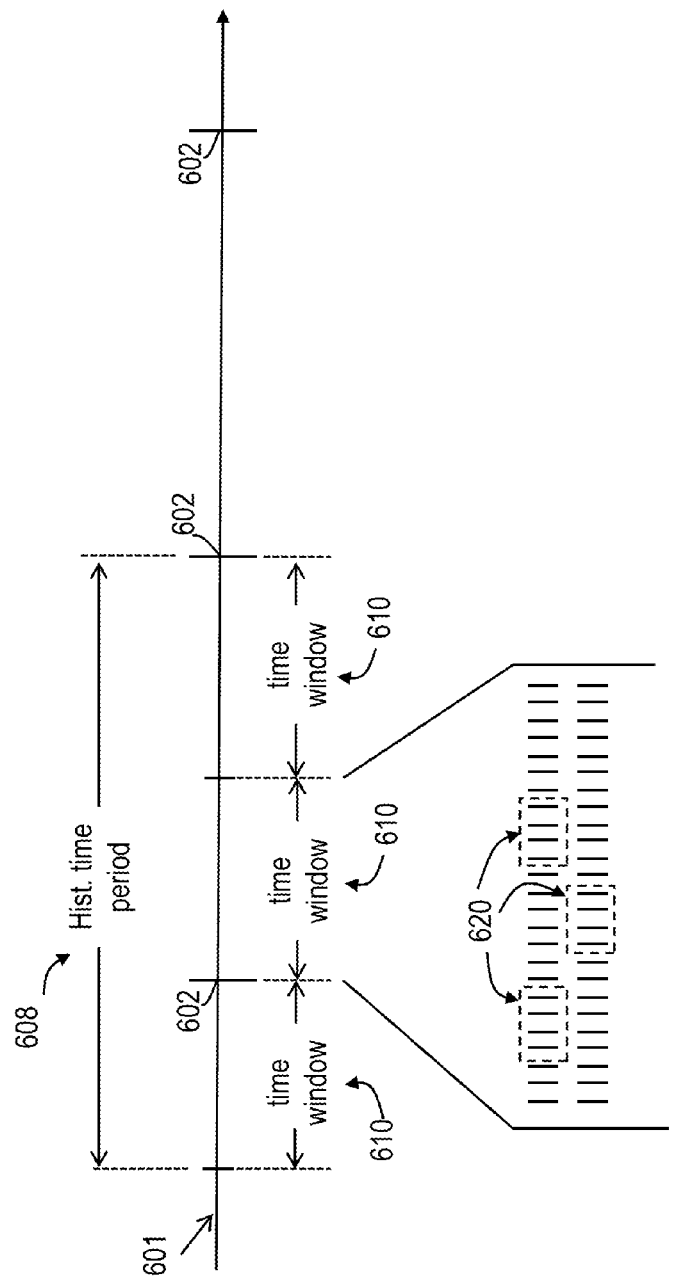
FIG. 6 illustrates the timing involved in the operation of the repeat API call sequence detection process.

In one illustrative implementation of the operation of the template generator 150, the template generator 150 analyzes sequences of API calls to determine if such sequences match sufficiently and occur with a particular timing to warrant the generation of a template 160. FIG. 6 illustrates a time line 601. One or more customers submit API calls to API servers 142 at various times along the time line. In one implementation, a matching API sequence detection process runs at predetermined time events 602 (e.g., every hour on the hour). At each time event 602, the template generator 150, which has been receiving API calls from the API server 142, analyzes API calls over a historical time period 608 as shown. The historical time period may be a configurable value. In one example, the time events 602 are every hour on the hour and the historical time period is 90 minutes. This means that every hour, the template generator 150 analyzes an hour and a half worth of API calls for the various customers that have submitted API calls during that 90 minute historical time period.

A time window 610 may be defined within each historical time period 608. The time window 610 generally is shorter than the historical time period 608. Continuing the example above in which the historical time period is 90 minutes, the time window 610 may be, for example, 30 minutes. During each time window 610 period of time (e.g., 30 minutes), the template generator 150 attempts to identify multiple sequences of API calls that each include the same API calls and in the same order. For example, a list of the API calls made over a time period can be stored in persistent storage. The template generator 150 can access the list and use a text parser to read the data associated with each API call and attempt to identify patterns. For all such API call sequences (same calls in the same order), the template generator 150 performs any or all of the following determinations:

Determines whether each API call sequence has at least a minimum number of API calls. This minimum number of API calls may be a configurable value.

Determines whether each API call sequence occurred in less than a maximum sequence time period. The maximum sequence time period also may be a configurable value.

Determines whether the input parameters for corresponding API calls between the candidate sequences are sufficiently close.

On this latter point about the input parameters being sufficiently close, a pair of API sequences may have the same API calls (i.e., same API call method names) and in the same order. These API sequences thus have corresponding API calls. For example, two sequences may have the following four API calls A, C, D, and F. API call A is present in each sequence and thus both sequences have the same corresponding API call A, the same corresponding API call C, etc. Despite, an API call of the same method name being present in both sequences, such corresponding API calls may not be considered to "match" sufficiently to warrant the generation of a template 160 if the API call in one sequence has input parameters that vary by more than a predetermined amount from the input parameters of the corresponding API call in another sequence. That is, in some embodiments, templates 160 are generated for repeat sequences of the same API calls as long as the input parameters for each pair of corresponding API calls among the sequences either are the same or at least a threshold-controllable number of the input parameters are the same. For example, if a given API call occurs in two different sequences of API calls and that API call has 10 input parameters, a 20% threshold may be set to preclude the sequences from determined to be matching if more than 20% of the input parameters for the corresponding API calls differ. In the example of a 10-input parameter API call, this would mean that two instances of an API call of the same API call method name would be considered to be the same API call as long as no more than no more than two input parameters were different. Alternatively stated, at least 80% of the input parameters would have to be the same in this example for two API calls of the same API call method name to be considered the same API call for purposes of the template generation process. This also means that two API call sequences are considered to match even though not all of the input parameters between corresponding API calls of the sequences are the same. The threshold amount for how closely the input parameters must match may be specified as a proportion (e.g., a percentage) of the number of input parameters or as a raw number (e.g., 5 input parameters).

The template generator 150 determines whether a matching sequence repeats more than a threshold number of times within a given time window 610 and, upon finding such sequences, generates an executable template. In some examples, the template generator 150 generates a template for a given sequence of API calls when the template generator 150 finds a sequence of API calls for which the following are true:

Of sufficient length,

Occurred in less than a maximum sequence time period,

Multiple instances of the same sequence occurs in a time window period of time (same API calls and in the same order), and The input parameters for corresponding API calls do not differ more by than a threshold amount.

Any of the configurable values described herein (e.g., the threshold amount used to determine if a sufficient number of input parameters for a pair of corresponding API calls, the maximum sequence time period, etc.) may be configured using, for example, a computer with a browser coupled to the Internet 105 and/or web services platform 102. Non-volatile storage may be provided in the web services platform 102 to store the configurable values for subsequent retrieval and use by the template generator 150.

Figure 7:
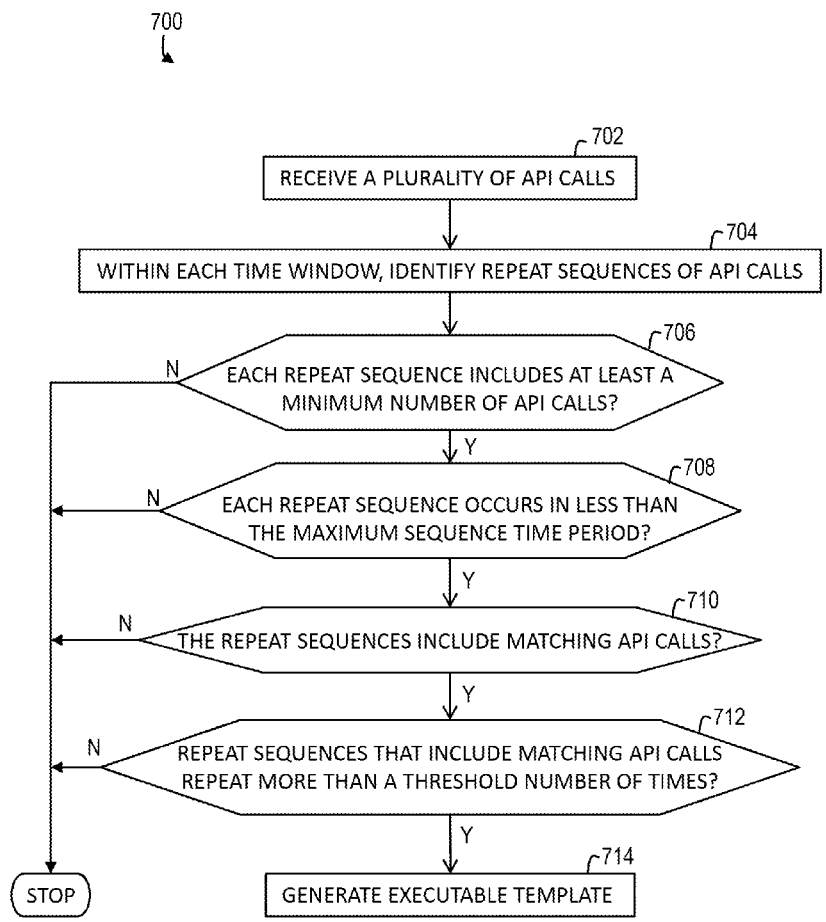
FIG. 7 shows a method in accordance with an example.

FIG. 7 provides an example of a method 700 which may be performed by a computing system such as the template generator 150. The process of the example of FIG. 7 may be performed at each scheduled time event 602 (e.g., once per hour) and may be performed using the API call historical data within each time window 610.

At 702, the template generator 150 receives a plurality of API calls. Each API call is operative to invoke a function of a web service. The API calls may be received by the template generator 150 from the API requester 116 via the API server 142. At 704, within a time window, the method 700 includes identifying repeat sequences of API calls. Such sequences may be identified by identifying repeat sequences of API calls that include the same API calls (e.g., same API call method name) and in the same order. At 706, the method includes determining whether each API call sequence identified at 704 includes at least a minimum number of API calls. The minimum number of API calls may be a configurable value and may be specified to prevent the template generator 150 from analyzing API call sequences that are deemed too short to warrant generating a template 160. In one example, the minimum number of API calls may be 10, but in general can be any value desired.

At 708, the method includes determining whether each repeat sequences occurs in less than a maximum sequence time period. The maximum sequence time period may be a configurable value. The maximum sequence time period excludes those API call sequences from consideration by the template generator 150 that were initiated by a customer over a time period that is longer than the maximum sequence time period. This configuration parameter permits analysis by the template generator of generally shorter duration API call sequences.

At 710, the method includes determining whether the repeat sequences of API calls identified at 704 and determined to have at least the minimum of API calls and occurred in less than the maximum sequence time period include corresponding API calls that "match." In this example, a pair of corresponding API calls in two instances of an API sequence are considered to be the same if the input parameters for such API calls are the same or do not differ by more than a threshold amount. For example, the threshold amount may be 10% which means that a "true" (yes) determination at 710 results when the input parameters from a pair of corresponding API calls in two sequences do not differ by more than 10%.

At 712, the method includes determining whether the repeat sequences of API calls repeat by more than a threshold number of times. This particular threshold value may be configurable and provides control over the number of repetitions of a given API call sequence before the template generator 150 will generate a template. In one example, the threshold value may be 15, which means that the template generator 150 will generate a template for API call sequences that repeat at least 15 times within the corresponding time window 610.

At 714, the template generator 150 generates the template 160. In this example, the template generator 150 will generate a template for an API call sequence that has at least a minimum number of API calls (706), was performed in less than a maximum sequence time period (708), includes API calls that have input parameters that do not vary by more than a threshold amount from the input parameters of the corresponding API calls among the repeat instances of the API call sequences (710), and that repeated by more than a threshold number of times. If any of the checks in the flow chart of FIG. 7 do not result in a "yes" result, a template will not be generated and the process may repeat for other potential API call sequences and/or for other time windows 610.

The following is a pseudo code listing of an illustrative implementation of the operation of the template generator. The "Inputs" portion below includes the various inputs that may be provided.

Inputs:
1) Time of each API call—specified, for example, by a time stamp included with each API call
2) API method name
3) API input parameters—one or more input parameters for whichever API calls include such parameters
4) API classification—API calls can include a classification type which can be used, for example, to filter which API calls are considered in the sequence detection process. That is, API calls of certain classes can be excluded by the template generator 150 in its pattern detection process.
5) Time elapsed since previous API call—derived value based, for example, on time stamps
6) User profile—may include customer identifiers which can be used, for example, to include or exclude API calls from certain customers from the pattern detection process.

The "Configuration" portion below includes the various parameters that can be configured to control the operation of the template generator as it searches for repeat sequences of API calls.

Configuration:
(a) Frequency of algorithm calculation—specifies a schedule for time events. The template generator performs its sequence detection process at each scheduled time event. In one example, the time events are specified to be every hour at 10 minutes past the hour.
(b) Time slot length to analyze for pattern matches (e.g. look at 30 minutes of activity for any pattern matches)
(c) Number of matches before it is considered a pattern— The number of times a particular sequence repeats in order for the template generator 150 to generate a template.
(d) Percentage of allowed differences between parameters of the same API call in different slots (e.g. if 9 of the 10 parameters are the same, it is a 10 percent difference)
(e) Time period to analyze calculated in hours. Will be as block of time of times number of hours ago to now.
(f) Minimum number of API calls required in a sequence of API calls in order for the sequence to be considered for generation of template
(g) Maximum amount of time for pattern—the maximum length of time a particular sequence can take to be performed for the sequence to be considered by the template generator 150.

The repeat API call sequence detection algorithm performed by the template generator:

Main:

```
//initialize a list of potential sequence candidates and a list of
actual matching, repeat sequences
List<Pattern> allPotentialPatterns;
List<Pattern> allPatternMatches;
//references below to letters in brackets [ ] refer to the
configuration points a-g above.
//the following pseudo code portion finds and stores
potential sequences of API calls in the HallPotentialPatterns
list
if ( Now% [a] == 0) {           //It is time to execute
   for (each minute in (Now-[e]) ) {
      List potentialPatternsInPeriod = analyzePeriod(startMin,
      startMin+[b]);
      allPotentialPatterns.addAll( potentialPatternsInPeriod );
   }
}
//The following pseudo code portion determines if a given
potential sequence in the //allPotentialPatterns list matches
any of the other potential sequences in the allPotentialPatterns
//list.
for (Pattern pattern: allPotentialPatterns) {
      if (matchPattern(pattern, each other Pattern in
      allPotentialPatterns)) {
         allPatternMatches.add(pattern);
      }
}
/* Analyzes a period and return a list of potential patterns */
List<Pattern> analyzePeriod(startMin, endMin) : {
//identify sequences that are of at least a minimum number of API
calls and have API calls that are the same and in the same order.
}
```

```
/* Return true if patternA closely matches patternB */
boolean matchPattern(Pattern patternA, Pattern patternB) {
      if ( API call sequence in patternA == API call
      sequence in patternB &&
      patternA params [3] in each call is less than [d] %
      different than params [3] in patternB )
   {
      return true;
   } else {
      return false;
   }
}
```

Figure 8:
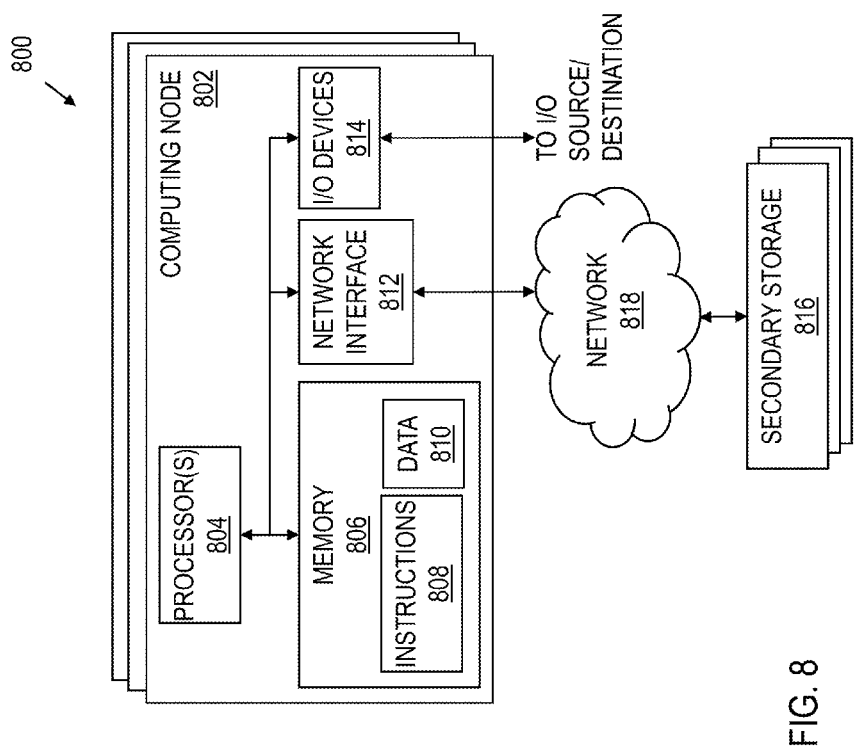
FIG. 8 is a block diagram of computing node in accordance with various implementations.

FIG. 8 shows a schematic diagram for a computing system 800 suitable for implementation of the web services platform 102, including the functionality of detecting repeated operations by customers in order to generate executable templates. The system includes one or more computing nodes 802. The computing system 800 includes the computing nodes 802 and secondary storage 816 communicatively coupled together via a network 818. One or more of the computing nodes 802 and associated secondary storage 816 may be applied to provide the functionality of the web services platform 102, including the management service 140, the workflow server 148, the API server 142, the data store 144, and the event queue 146, as well as the template generator 150 and template executor 170, etc.

Each computing node 802 includes one or more processors 804 coupled to memory 806, network interface 812, and I/O devices 814. In some embodiments, a computing node 802 may implement the functionality of more than one component of the system 100. In various embodiments, a computing node 802 may be a uniprocessor system including one processor 804, or a multiprocessor system including several processors 804 (e.g., two, four, eight, or another suitable number). Processors 804 may be any suitable processor capable of executing instructions. For example, in various embodiments, processors 804 may be general-purpose or embedded microprocessors implementing any of a variety of instruction set architectures (ISAs), such as the x86, PowerPC, SPARC, or MIPS ISAs, or any other suitable ISA. In multiprocessor systems, each of processors 804 may, but not necessarily, commonly implement the same ISA. Similarly, in a distributed computing system such as one that collectively implements the web services platform 102, each of the computing nodes 602 may implement the same ISA, or individual computing nodes and/or replica groups of nodes may implement different ISAs.

The memory 806 may include a non-transitory, computer-readable storage device configured to store program instructions 808 and/or data 810 accessible by processor(s) 804. The system memory 806 may be implemented using any suitable memory technology, such as static random access memory (SRAM), synchronous dynamic RAM (SDRAM), nonvolatile/Flash-type memory, or any other type of memory. Program instructions 808 and data 810 implementing the functionality disclosed herein are stored within system memory 806. For example, instructions 808 may include instructions that when executed by processor(s) 804 implement the template generator 150, the management service 140, the workflow server 148, the API server 142, the data store 144, the event queue 148, and/or other components of the web services platform 102 disclosed herein.

Secondary storage 816 may include volatile or non-volatile storage and storage devices for storing information such as program instructions and/or data as described herein for implementing the web services platform 102. The secondary storage 616 may be used as the template storage 155 (FIG. 1). The secondary storage 816 may include various types of computer-readable media accessible by the computing nodes 802 via the network 818. A computer-readable medium may include storage media or memory media such as semiconductor storage, magnetic or optical media, e.g., disk or CD/DVD-ROM, or other storage technologies. Program instructions and data stored on the secondary storage 816 may be transmitted to a computing node 802 for execution by a processor 804 by transmission media or signals via the network 818, which may be a wired or wireless network or a combination thereof.

The network interface 812 may be configured to allow data to be exchanged between computing nodes 802 and/or other devices coupled to the network 818 (such as other computer systems, communication devices, input/output devices, or external storage devices). The network interface 812 may support communication via wired or wireless data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 814 may include one or more display terminals, keyboards, keypads, touchpads, mice, scanning devices, voice or optical recognition devices, or any other devices suitable for entering or retrieving data by one or more computing nodes 802. Multiple input/output devices 814 may be present in a computing node 802 or may be distributed on various computing nodes 802 of the system 800. In some embodiments, similar input/output devices may be separate from computing node 802 and may interact with one or more computing nodes 802 of the system 800 through a wired or wireless connection, such as over network interface 812.

Those skilled in the art will appreciate that computing system 800 is merely illustrative and is not intended to limit the scope of embodiments. In particular, the computing system 800 may include any combination of hardware or software that can perform the functions disclosed herein, including computers, network devices, internet appliances, PDAs, wireless phones, pagers, etc. Computing node 802 may also be connected to other devices that are not illustrated, in some embodiments. In addition, the functionality provided by the illustrated components may in some embodiments be combined in fewer components or distributed in additional components. Similarly, in some embodiments the functionality of some of the illustrated components may not be provided and/or other additional functionality may be available.

Those skilled in the art will also appreciate that in some embodiments the functionality disclosed herein may be provided in alternative ways, such as being split among more software modules or routines or consolidated into fewer modules or routines. Similarly, in some embodiments illustrated methods may provide more or less functionality than is described, such as when other illustrated methods instead lack or include such functionality respectively, or when the amount of functionality that is provided is altered. In addition, while various operations may be illustrated as being performed in a particular manner (e.g., in serial or in parallel) and/or in a particular order, those skilled in the art will appreciate that in other embodiments the operations may be performed in other orders and in other manners. The various methods as depicted in the figures and described herein represent illustrative embodiments of methods. The methods may be implemented in software, in hardware, or in a combination thereof in various embodiments. Similarly, the order of any method may be changed, and various elements may be added, reordered, combined, omitted, modified, etc., in various embodiments.

What is claimed is:

1. A non-transitory computer-readable medium storing instructions that when executed on a computing system cause the computing system to:
receive a plurality of application programming interface (API) calls in each of a plurality of customer sessions, each API call operative to invoke a function of a web service and at least some of the API calls including a plurality of input parameters;

determine repeat matching sequences of the received API calls within each of a plurality of a given customer's sessions as well as across customer sessions of multiple customers, a pair of sequences of API calls determined to be matching if the pair of sequences includes the same API calls and in the same order, and less than a threshold amount of input parameters between corresponding API calls in each such sequence are different;

generate an executable template for a repeat matching sequence of API calls; and execute the template to generate and send API calls to one or more web services to invoke one or more function of the one or more web services.

2. The non-transitory storage device of claim 1 wherein the instructions, when executed by the computing system, cause the computing system to:

determine which input parameters between a pair of corresponding API calls from each sequence are not the same; and upon execution of the template, generate an input prompt to receive a value for each such different input parameter.

3. The non-transitory storage device of claim 1 wherein for each session identified by a session identifier, the instructions, when executed by the computing system cause the computing system to detect the matching sequences of API calls based on API call method names, an identified sequence of the API calls, and input parameters for at least some of the API calls.

4. The non-transitory storage device of claim 1 wherein the instructions, when executed, cause the computing system to determine whether, for the pair of sequences of API calls, each such sequence:

has more than a threshold number of API calls; and spans less than a threshold maximum sequence time period.

5. The non-transitory storage device of claim 4 wherein the instructions, when executed, cause the computing system to generate the executable template for the repeating matching sequence of API calls upon determining that the sequence includes at least the threshold number of API calls;

the sequence repeats more than a threshold number of times within a threshold time window;

that, among the repetitions of the sequence, less than the threshold amount of input parameters are different; and the sequence occurs in less than the threshold maximum sequence time period.

6. A system, comprising:

a template generator including memory coupled to a processor, the memory including instructions that upon execution, cause the template generator to:

identify a plurality of sequences of application programming interface (API) calls that include the same API calls and in the same order;

determine whether such sequences of API calls match by determining whether a configurable threshold amount of input parameters for corresponding API calls among the plurality of sequences are the same;

determine whether a matching sequence repeats more than a threshold number of times within a time window; and generate an executable template for the matching sequence based on the matching sequence repeating more than the threshold number of times within a time window; and a template executor including memory coupled to a processor, the memory including instructions that upon execution, cause the template generator to, in response to a user selection of an executable template via a user interface, execute the user-selected executable template to issue API requests corresponding to the matching sequence to one or more web services.

7. The system of claim 6 wherein the configurable threshold amount of input parameters having to be the same for a plurality of sequences to match is specified as a proportion of a number of input parameters for each API call.

8. The system of claim 6 wherein when executed, the instructions in the memory of the template generator further cause the template generator to identify the plurality of sequences of API calls by identifying a plurality of sequences of API calls that include at least a configurable minimum number of API calls.

9. The system of claim 6 wherein when executed, the instructions in the memory of the template generator further cause the template generator to identify the plurality of sequences of API calls by identifying sequences that occur in less than a maximum sequence time period.

10. The system of claim 6 wherein when executed, the instructions in the memory of the template generator further cause the template generator to generate the template for a given sequence of API calls based on:

for corresponding API calls that include multiple input parameters in repeat instances of the given sequence, the input parameters are different, if at all, by less than a threshold amount;

each repeat instance includes at least a minimum number of API calls; and each repeat instance occurs in less than a maximum sequence time period.

11. The system of claim 6 wherein when executed, the instructions in the memory of the template generator further cause the template generator to identify the plurality of sequences across different customer identifiers.

12. The system of claim 6 wherein when executed, the instructions in the memory of the template generator further cause the template generator to determine whether such sequences of API calls match based on at least one of: API call time stamps, customer identifiers, digital signatures, internet protocol (IP) addresses, tags, availability zone identifiers, and instance identifiers.

13. The system of claim 6 wherein when executed, the instructions in the memory of the template generator further cause the template generator to determine whether such sequences of API calls match based on at least two of: API call time stamps, customer identifiers, digital signatures, internet protocol (IP) addresses, tags, availability zone identifiers, and instance identifiers.

14. The system of claim 6 wherein when executed, the instructions in the memory of the template generator further cause the template generator to cause a message to be displayed to receive customer consent for the template to be generated.

15. A method, comprising:

receiving, by a computing system, a plurality of application programming interface (API) calls, each API call operative to invoke a function of a web service;

within a time window, identifying, by the computing system, repeat sequences of API calls;

determining, by the computing system, whether the repeat sequences of API calls include matching API calls;

determining, by the computing system, whether the repeat sequence of API calls that include matching API calls is repeated more than a threshold number of times within the time window;

based on the repeat sequence of API calls determined to include matching API calls and determined to repeat more than the threshold number of times within the time window, generating, by the computing system, an executable template for the repeat sequence of API calls; and executing the executable template, by the computing system, to invoke functions of the web service.

16. The method of claim 15 further comprising causing a prompt to be displayed acknowledging that a repeat sequence of matching API calls has been determined and receiving an input consenting to the executable template to be generated.

17. The method of claim 15 further comprising determining that the repeat sequence of API calls includes matching API calls based on, for corresponding API calls that include multiple input parameters, the input parameters being different, if at all, by less than a threshold amount.

18. The method of 15 wherein identifying repeat sequences of API calls includes identifying sequences of API calls that include at least a configurable minimum number of API calls.

19. The method of claim 15 wherein identifying repeat sequences of API calls includes identifying sequences occurring in less than a maximum sequence time period.

20. The method of claim 15 wherein executing the executable template comprises displaying a prompt to receive an input parameter to perform at least one of the API calls on which the template was generated.

* * * * *